(12) United States Patent
Hashida et al.

(10) Patent No.: US 7,740,981 B2
(45) Date of Patent: Jun. 22, 2010

(54) ASSEMBLED BATTERY INCLUDING INSULATING SUPPORT PLATE CONNECTED TO A TERMINAL SURFACE

(75) Inventors: Osamu Hashida, Yokohama (JP); Teruo Segawa, Ayase (JP); Satoshi Muramatsu, Ebina (JP); Takahiro Iwasaki, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1202 days.

(21) Appl. No.: 11/313,233

(22) Filed: Dec. 20, 2005

(65) Prior Publication Data

US 2006/0145657 A1 Jul. 6, 2006

(30) Foreign Application Priority Data

Dec. 27, 2004 (JP) ............................. 2004-377852
Oct. 20, 2005 (JP) ............................. 2005-305932

(51) Int. Cl.
*H01M 6/42* (2006.01)
(52) U.S. Cl. ........................ 429/160; 429/158; 429/159
(58) Field of Classification Search ........................ None
See application file for complete search history.

(56) References Cited

U.S. PATENT DOCUMENTS

2006/0208698 A1 * 9/2006 Maguire et al. ............. 320/116

FOREIGN PATENT DOCUMENTS

JP 2001-345082 12/2001

* cited by examiner

*Primary Examiner*—Dah-Wei D Yuan
*Assistant Examiner*—Maria J Laios
(74) *Attorney, Agent, or Firm*—Young Basile

(57) ABSTRACT

An assembled battery is equipped with an insulating support plate supporting bus bars, omits the bolting operation and can simplify the operation of electrically connecting the bus bars to electrode terminals. The assembled battery includes a plurality of battery modules having output terminals. An insulating bus bar plate (support plate) supports conductive bus bars that are electrically connected to the terminal surfaces. A guide movably guides the bus bar plate between a first position in which the bus bars are electrically connected to the terminal surfaces and a second position in which the bus bars are separated from the terminal surfaces. A lock supports the bus bar plate in the first position and maintains the bus bars in a state that is forcibly connected to the terminals surfaces.

19 Claims, 7 Drawing Sheets

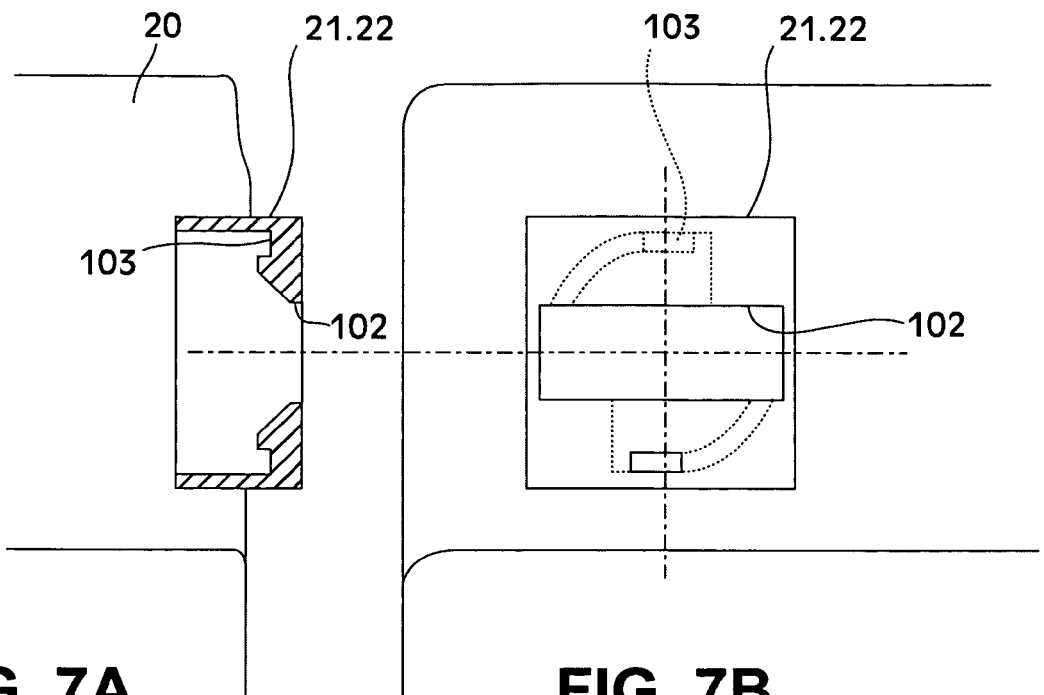
FIG. 7A  FIG. 7B
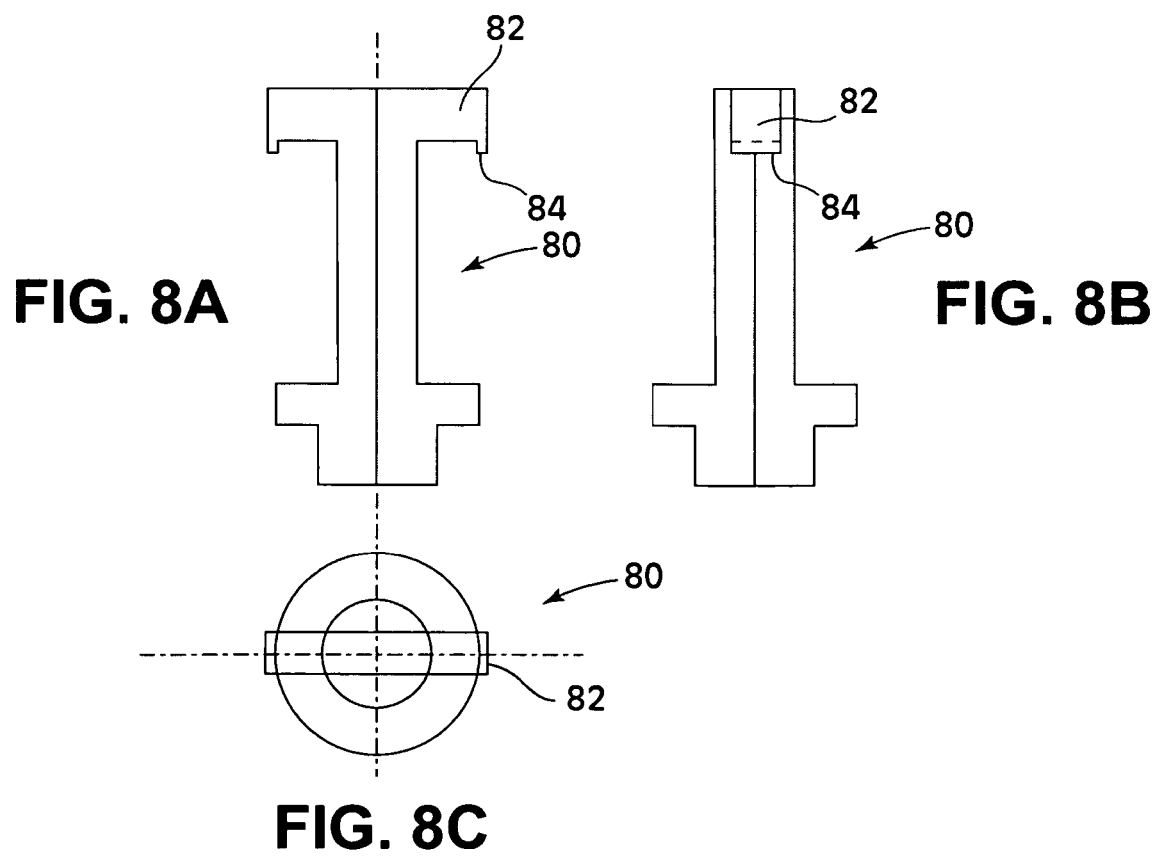
FIG. 8A  FIG. 8B
FIG. 8C

ASSEMBLED BATTERY INCLUDING INSULATING SUPPORT PLATE CONNECTED TO A TERMINAL SURFACE

This application claims priority under 35 U.S.C. 119 to Japanese Patent Application No. 2004-377852, filed Dec. 27, 2004, and Japanese Patent Application No. 2005-305932, filed Oct. 20, 2005, the entire disclosure of which is hereby incorporated herein by reference.

TECHNICAL FIELD

The present invention relates to assembled batteries.

BACKGROUND

Generally, an assembled battery with high output and high capacity is made by arranging a plurality of batteries and connecting each battery serially or in parallel. In some cases, when an assembled battery is constructed, a plurality of conductive bus bars connected to electrode terminals of a plurality of batteries are kept in an insulating support plate made of resin material. By attaching this support plate and connecting each bus bar to the electrode terminals with bolts, a plurality of batteries are connected. The support plate is also called a bus bar plate.

In assembled batteries that use a bus bar plate, it is often necessary to bolt all the bus bars to each electrode terminal. Therefore, its operation is cumbersome and takes a relatively long time. Furthermore, during the bolting operation, bolts may fall off and connect to other electrode terminals, resulting in a short circuit.

SUMMARY

The present invention is directed to an assembled battery that is equipped with an insulating support plate that supports bus bars. The assembled battery omits the bolting operation and can simplify the operation of electrically connecting the bus bars to electrode terminals.

To achieve the above described objective, an assembled battery comprises a plurality of battery modules equipped with electrode terminals having a terminal surface and an insulating support plate that supports a conductive bus bar electrically connected to the terminal surface. A guide movably guides the support plate between a first position in which the bus bar is forcibly connected to the terminal surface and a second position in which the bus bar is separated from the terminal surface. A lock supports the support plate in the first position and maintains a state in which the bus bar is forcibly connected to the terminal surface.

With the guide, the support plate is moved to the first position where the bus bar is forcibly connected to the terminal surface. With the lock, the support plate is supported in the first position and the bus bar is forcibly connected to the terminal surface. Therefore, a plurality of bus bars supported in the support plate can be electrically connected to the electrode terminals of the batteries. Since the bolting operation is not required, this operation is extremely simple compared with the case where all the bus bars are bolted. Moreover, the operation time can be significantly shortened. Furthermore, since the bolting operation is not required, it is possible to fundamentally prevent generation of short circuit caused by bolts that fall off. The assembled battery of the present invention is equipped with the insulating support plate, which supports the bus bar, may prevent the bolting operation and may simplify the operation of electrically connecting the bus bar to the electrode terminal and generally facilitate the assembly of the battery.

The details of one or more embodiments of the invention are set forth in the accompanying drawings and the description below. Other features, objects and advantages of the invention will be apparent from the description and drawings, and from the claims.

BRIEF DESCRIPTION OF DRAWINGS

FIGS. 7A and 7B are a sectional side view and a front view, respectively, of an output terminal of a cell module of the second embodiment.

FIGS. 8A, 8B and 8C are a front view, flat view and a side view illustrating a clip used in the second embodiment.

DETAILED DESCRIPTION

Figure 1:
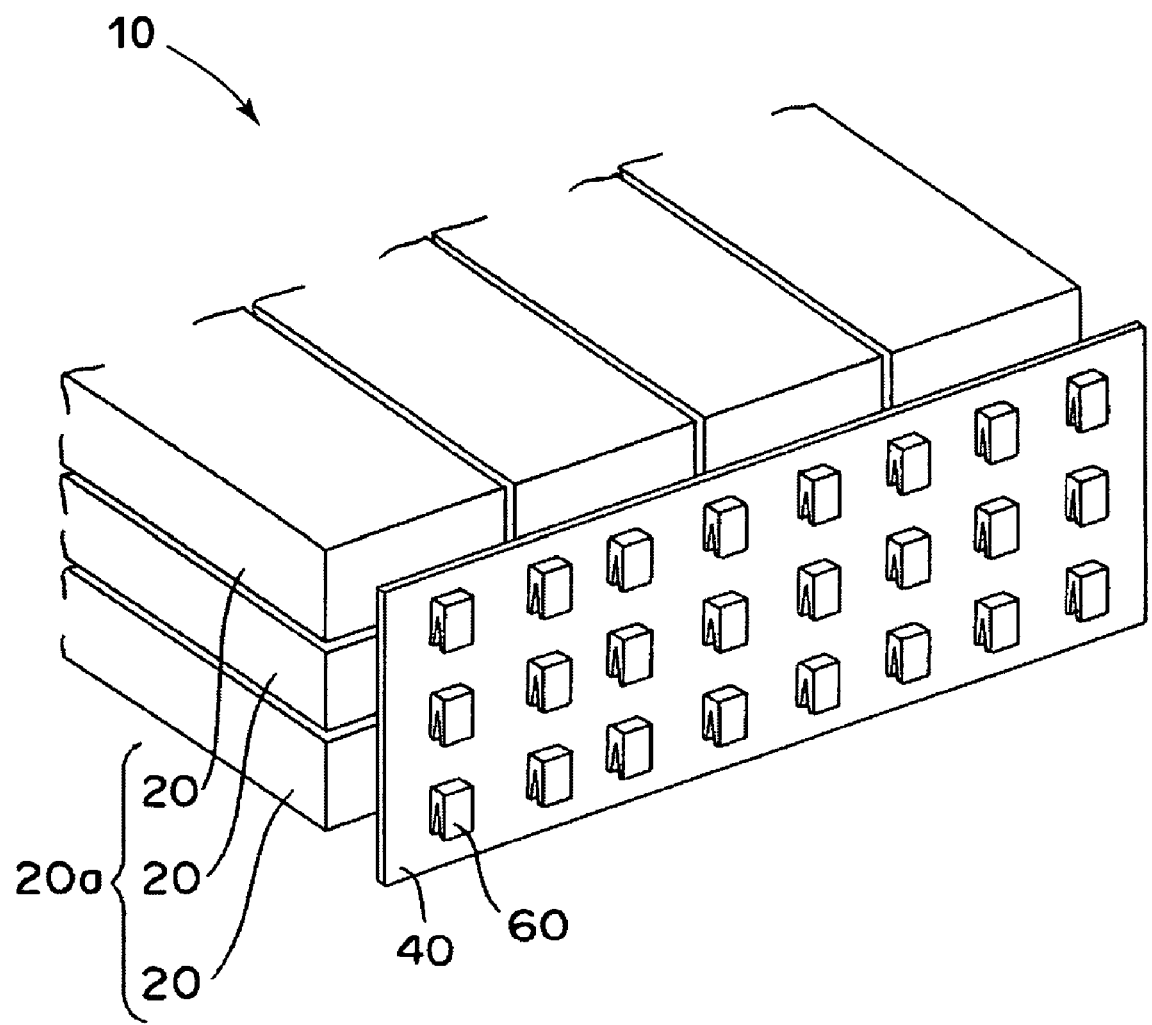
FIG. 1 is a perspective view illustrating the assembled battery of a first embodiment of the present invention.
Figures 2A, 2B:
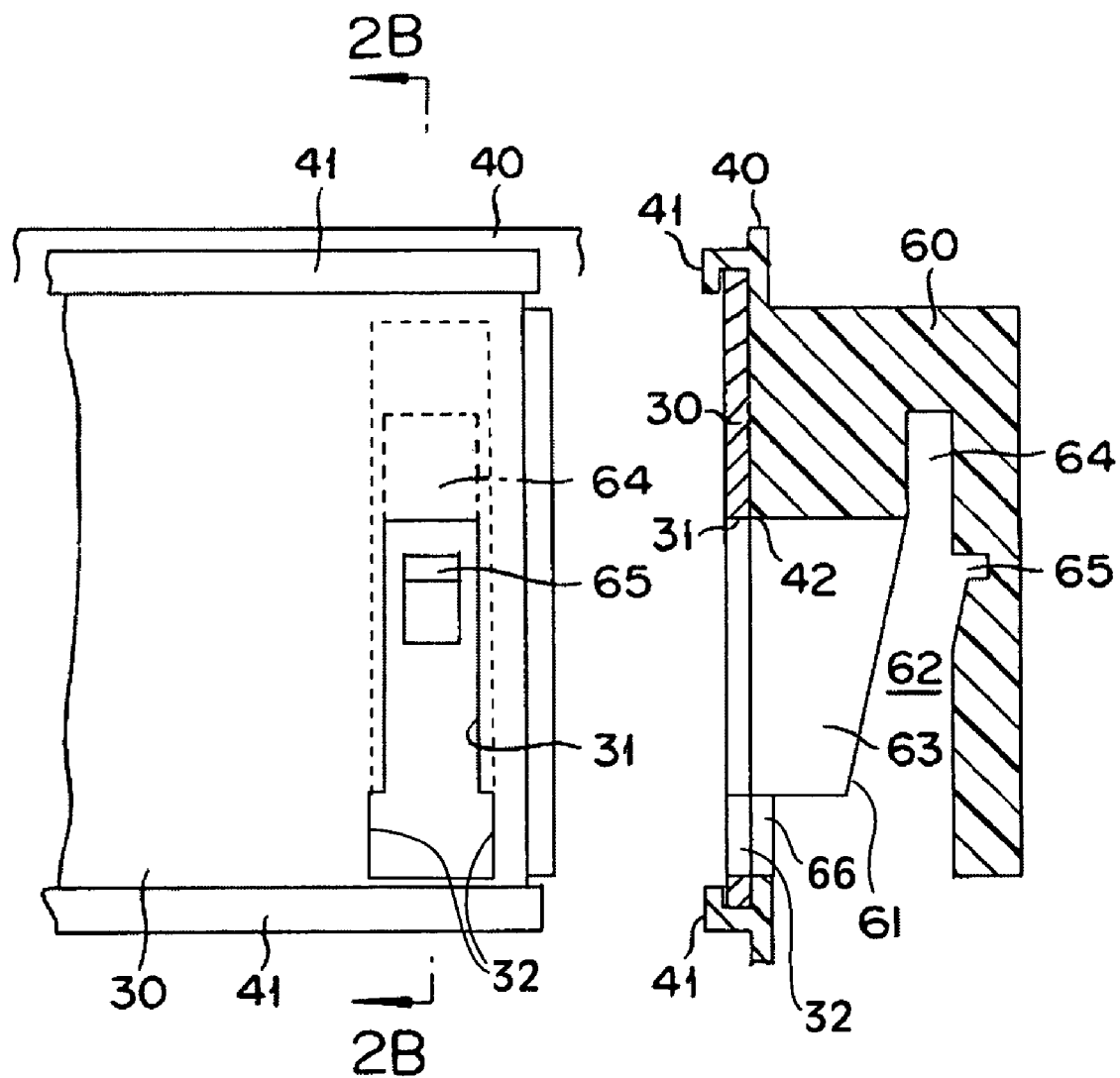
FIG. 2A is a rear view of the support plate viewed from the back of the battery.
FIG. 2B is a cross-sectional view along the line 2B-2B of FIG. 2A.
Figures 3A, 3B, 3C:
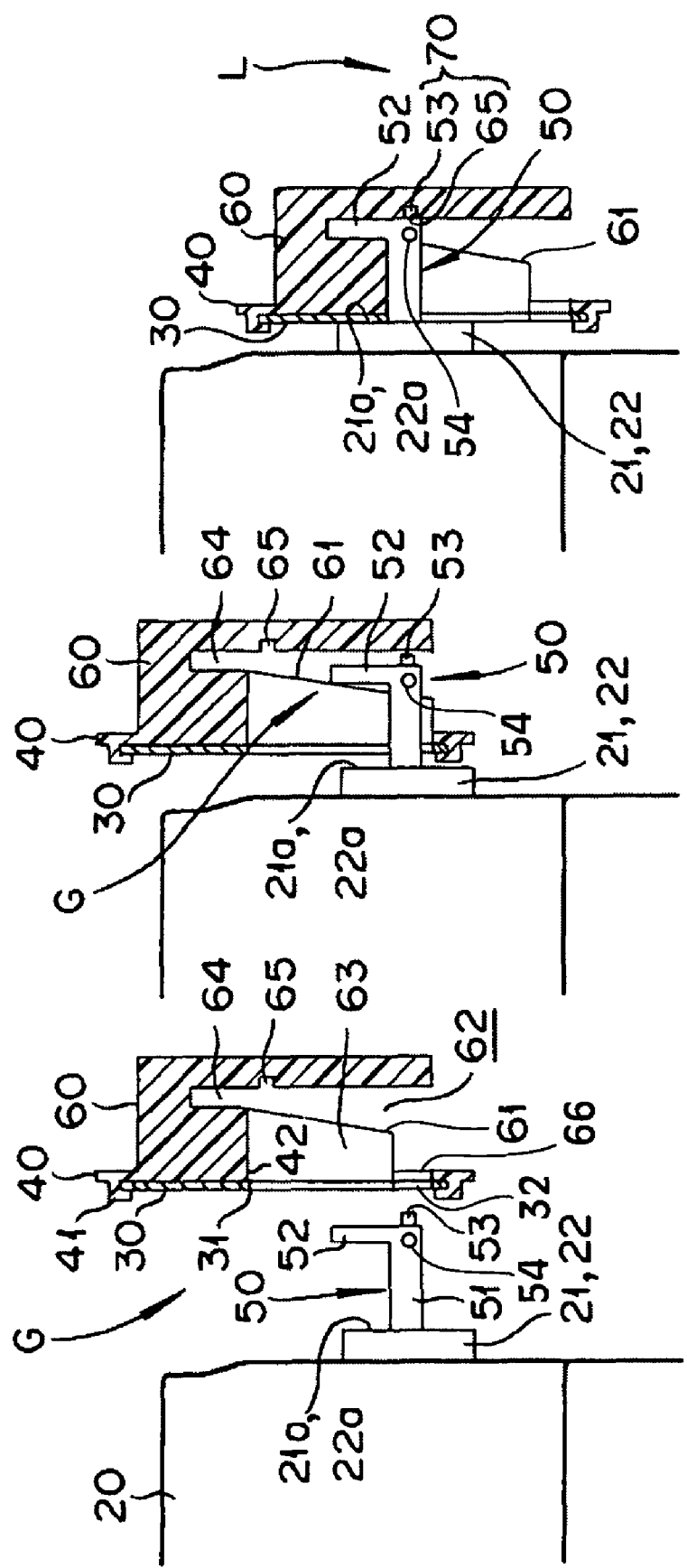
FIGS. 3A-3C are explanatory diagrams of the operation of the first embodiment.
Figure 4:
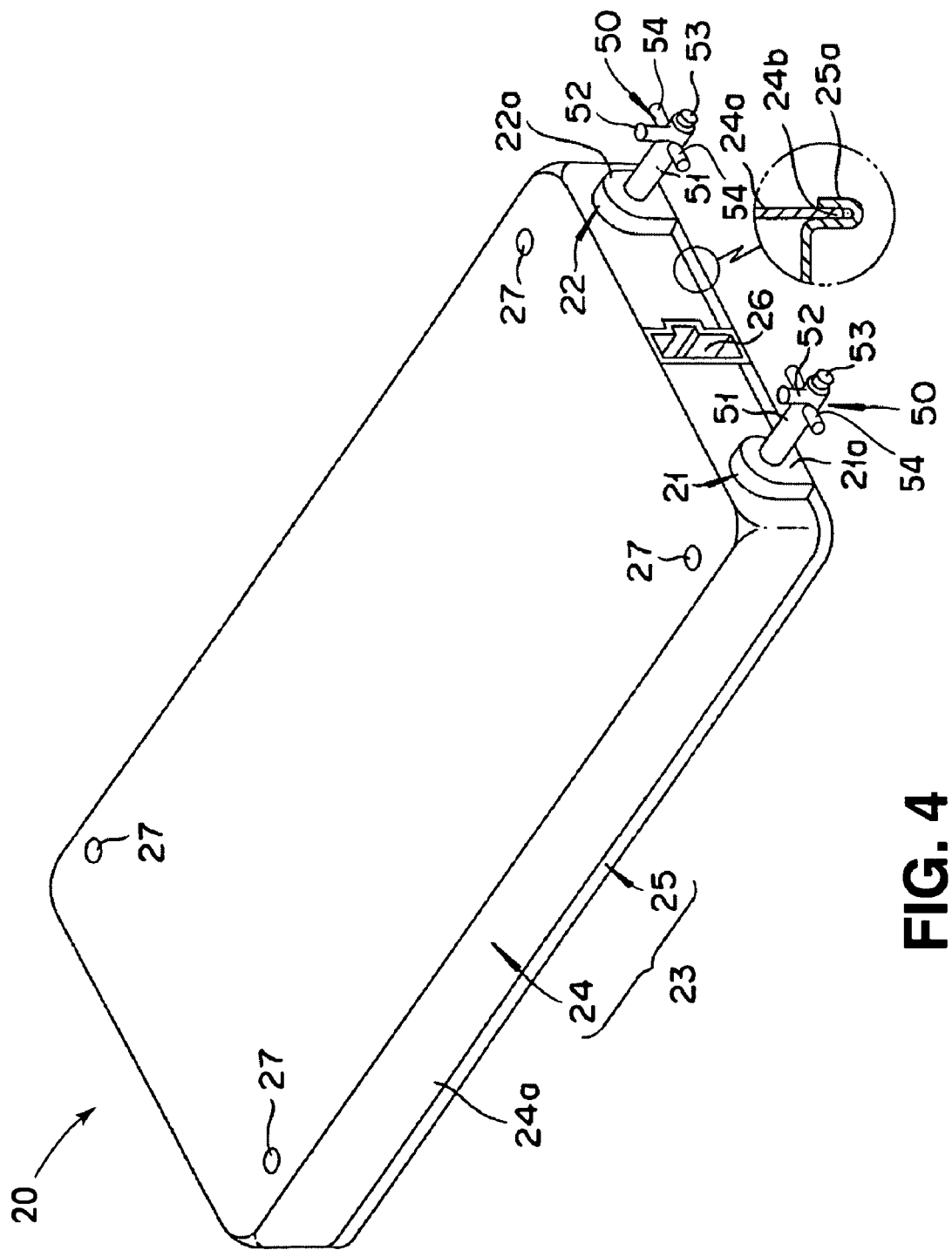
FIG. 4 is a perspective view illustrating an example of a battery module, which is a unit when an assembled battery is constructed.
Figure 5:
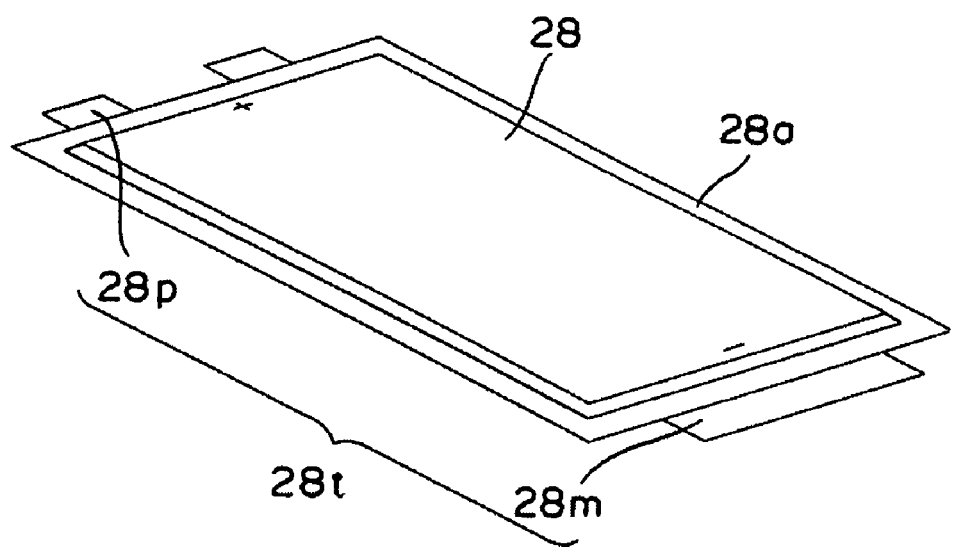
FIG. 5 is a perspective view illustrating an example of a flat-type battery cell.

FIG. 1 is a perspective view illustrating assembled battery 10 of a first embodiment of the present invention. FIG. 2A is a rear view of bus bar plate 40 from the side of battery module 20. FIG. 2B is a cross-sectional view along the line 2B-2B. FIGS. 3A-3C are explanatory diagrams of the operation of the first embodiment. FIG. 4 is a perspective view illustrating an example of a battery module 20, which is a unit when assembled battery 10 is assembled. FIG. 5 is a perspective view illustrating an example of flat-type battery cell 28. In FIG. 1, the surface located in the right front side is the front side of each member and the surface located in the left rear side is the rear side of each member.

According to FIGS. 1-3C, assembled battery 10 of the first embodiment is comprised of a plurality of battery modules 20 (modules) that are equipped with positive and negative output terminals 21 and 22 (electrode terminals), where terminal surfaces 21a and 22a are formed and insulating bus bar plate 40 (support plate) supports conductive bus bars 30 that are electrically connected to terminal surfaces 21a and 22a. Furthermore, assembled battery 10 is comprised of a guide (guiding means) G, which movably guides bus bar plate 40 between a first position in which bus bars 30 are forcibly connected to terminal surfaces 21a and 22a and a second position in which bus bars 30 are separated from terminal surfaces 21a and 22a. Lock (locking means) L supports bus bar plate 40 in the first position and maintains a state in which bus bars 30 are forcibly connected to terminal surfaces 21a and 22a. More detail will be described below.

Assembled battery 10 may be an in-vehicle battery that is loaded into a vehicle, such as an automobile or an electric train in which a plurality of battery modules are stacked with an interspace between each battery module. Although it is not shown in drawings, a plurality of battery modules 20 are stored in a case for an assembled battery that is connected to an entrance duct for introducing cooling wind and an exit duct for discharging the cooling wind.

By connecting a certain number of battery modules 20 serially and in parallel, it is possible to obtain assembled battery 10 having a desired electric current, voltage and capacity. Assembled battery 10 shown in the exemplary drawings contains twelve battery modules 20. Battery module groups 20a of FIG. 1 have three battery modules 20 that are stacked in the vertical direction and are arranged in four lines in the horizontal direction. Negative and positive output terminals 21 and 22 of battery modules 20 are placed in the same surface (front surface).

Battery modules 20 are air cooled, and the spaces between battery modules 20 are used as the path for a cooling wind through which the cooling wind flows to cool down each battery module 20. By blowing the cooling wind and cooling down each battery module 20, the battery temperature is decreased and deterioration of a battery property, such as the charging efficiency, is prevented. The length between battery modules 20 is determined based on the manner in which battery modules 20 are loaded in a vehicle and the size needed to function as the cooling wind path. In some instances, the length may be about two millimeters.

In FIGS. 4 and 5, battery modules 20 constitute the unit with which assembled battery 10 is assembled. Battery module 20 contains several sheets of flat-type battery cells 28, which are electrically connected to each other and are stored in module case 23. Here, battery modules 20 are one type of assembled battery 20 in that they have a plurality of unit cells that are electrically connected to each other. In the present invention, battery modules 20 are the unit used for constructing an "assembled battery," and the unit made from storing a plurality of cells in module case 23 is called a "battery module."

Module case 23 is comprised of housing 24 that has an entrance part and is shaped in a box and cover 25 that is a lid to close the entrance part. Edge part 25a of cover 25 may be tacked in edge part 24b of wall 24a of housing 24 by using a tack-back method (see the partial enlarged view of FIG. 4). Housing 24 and cover 25 may be made from relatively-thin steel plate or aluminum plate and shaped by press work.

Negative and positive output terminals 21 and 22 extend from module case 23 through a notched part created in one part of wall 24a of housing 24. Flat terminal surfaces 21a and 22a are formed in front of output terminals 21 and 22. Stud 50 (bar member), which will be described below, protrudes from terminal surfaces 21a and 22a.

Here, reference numeral 26 of FIG. 4 identifies a slot to which a connector (not shown in the figure) for detecting the electric pressure is inserted. The electric pressure is detected to manage charge and discharge of battery modules 20. Also, reference numeral 27 identifies a bolt hole through which a through bolt (not shown in the figure) for fixing a plurality of stacked battery modules 20 is inserted.

In FIG. 5, flat-type battery cell 28 is, for example, a flat lithium ion secondary battery and a laminate-type electric power generating factor (not shown in the figure) in which a positive electrode plate, negative electrode plate and separator are laminated and sealed by jacket material 28a such as a laminate film. In cell 28, one edge of plate-shaped electrode tab 28t (which is used as a general term for plus-side electrode tab 28p and minus-side electrode tab 28m) is electrically connected to the electric power generating factor and the electrode tab 28t is derived from jacket material 28a. Tab 28t is longitudinally extended to both sides of cell 28. In cell 28 having the laminate-type electric power generating factor, it is necessary to contain the electric power generating factor by placing pressure on it to achieve the uniformity of the distance between the electrode plates and maintain the battery performance. To do so, each cell 28 is stored in module case 23 so that the electric power generating factor is contained.

In FIGS. 1-3C, bus bar retainers 41 support each bus bar 30 and are formed in the rear side of bus bar plate 40. Entrance opening part 42 that passes from the front side through guide surface 61 is created in bus bar plate 40. Bus bar plate 40 may be made of insulating resin material. For example, PP (polypropylene) can be used as the insulating resin material, but the material is not limited to PP. Bus bars 30 are shaped in a flat rectangle having a through-groove 31 that passes from the front side through the rear side of bus bars 30. Entrance opening part 42 and through-groove 31 are both extended in the vertical direction in the figures. In bus bars 30, through-groove 31 communicates with entrance opening part 42 of bus bar plate 40 and is supported by bus bar retainer 41. Bus bar retainers 41 are formed so that they correspond to the location of electrically-connected output terminals 21 and 22. Therefore, by engaging bus bars 30 in bus bar retainers 41, it is possible to easily place each bus bar 30 in the location where bus bars 30 can correspond to output terminals 21 and 22. Since the direction and location where bus bars 30 can be supported by bus bar retainers 41 are limited, it is possible to fundamentally prevent misconnection.

According to the first embodiment, guiding means G is comprised of stud 50 (see FIGS. 3A-3C), which projects from terminal surfaces 21a and 22a, and guide block 60, which is placed in bus bar plate 40 and has guide surface 61 that guides stud 50. Guide surface 61 slopes to terminal surfaces 21a and 22a. By sliding guide block 60 in the direction parallel to terminal surfaces 21a and 22a (vertical direction in the figures), stud 50 is guided by guide surface 61 of guide block 60, and bus bar plate 40 moves between the first position and the second position. Furthermore, locking means L is placed in stud 50 and guide block 60 and has concave and convex engaging parts 70 that are engaged with each other as guide block 60 slides.

In FIGS. 3A-3C, stud 50 is comprised of first bar 51, which is fixed to output terminals 21 and 22 at its edge and extended in a direction perpendicular to terminal surfaces 21a and 22a, second bar 52, which is extended from the edge of first bar 51 in a direction parallel to terminal surfaces 21a and 22a in a vertical direction in the figure, and third bar 54 that extends from first bar 51 in a direction perpendicular to both first bar 51 and second bar 52 (that is, in the direction perpendicular to the surface of the page of FIGS. 3A-3C). Third bar 54 is placed on both sides of first bar 51 centering on first bar 51 (see FIG. 4). Stud 50 further comprises a third bar 54 that is guided by guide surface 61. Materials for stud 50 are not limited to, but include, resin material.

Guide block 60 is placed in the front side of bus bar plate 40 and is formed in an integrated manner with bus bar plate 40. Space 62, which extends in a vertical direction in the figure, is formed inside guide block 60. Space 62 communicates with entrance opening 42 of bus bar plate 40 through notch 63. Among the inner surface of guide block 60, which creates space 62, the front side of bus bar plate 40 becomes guide surface 61 that guides stud 50. Guide surface 61 slopes to terminal surfaces 21a and 22a. Notch 32 is created under through-groove 31 of bus bar 30, and notch 66 is created under notch 63 of guide block 60 so that third bar 54 of stud 50 can pass through (see FIG. 2). Stud 50 passes through through-groove 31 of bus bars 30, entrance opening part 42 of bus bar plate 40 and notch 63 of guide block 60 and reaches to space 62. Here, third bar 54 of stud 50 reaches space 62 through notches 32 and 66. Third bar 54 of stud 50, which reaches space 62, can contact sloped guide surface 61. Therefore, guide surface 61 of guide block 60 is able to guide stud 50. Storage room 64, where second bar 52 of stud 50 is engaged, is created in the upper edge of space 62 shown in the figure. Third bar 54 is inserted in notches 32 and 66. By this engagement, the state in which the electrodes 21, 22 are pressed into the bus bar 30 is achieved.

Concave and convex engaging part 70 is comprised of convex engaging part 53, which is formed in the front side of first bar 51, and concave engaging part 65, which is formed in the inner surface of guide block 60 and corresponds to guide surface 61.

By guiding means G, which has stud 50 and guide block 60, bus bar plate 40 is movably supported between the first position in which bus bars 30 are forcibly connected to terminal surfaces 21a and 22a and the second position in which bus bars 30 are separated from terminal surfaces 21a and 22a. That is, after stud 50 passes through through-groove 31 of bus bar 30, entrance opening part 42 of bus bar plate 40, notch 63 of guide block 60, and notches 32 and 66, third bar 54 is placed inside space 62. Therefore, bus bar plate 40 is supported in the second position wherein bus bars 30 are separated from terminal surfaces 21a and 22a (see FIGS. 3A and 3B). Also, third bar 54 of stud 50 reaches a position where third bar 54 can contact guide surface 61. When guide block 60 is slid downward in a direction parallel to terminal surfaces 21a and 22a (vertical direction in the figure), third bar 54 of stud 50 is guided by guide surface 61 of guide block 60, and at the same time bus bar plate 40 moves toward terminals surfaces 21a and 22a. When guide block 60 is slid further downward, second bar 52 of stud 50 is engaged in storage room 64 of guide block 60. Therefore, bus bar plate 40 moves to the first position in which bus bars 30 are forcibly connected to terminals surfaces 21a and 22a (see FIG. 3C).

Then, by locking means L, which has concave and convex engaging parts 70, bus bar plate 40 is supported in the first position. That is, when second bar 52 of stud 50 is engaged in storage room 64 by sliding guide block 60, convex engaging part 53 of stud 50 is engaged in concave engaging part 65 of guide block 60, and stud 50 is fixed. Therefore, bus bar plate 40 is supported in the first position, thereby maintaining a state in which bus bars 30 are forcibly connected to terminals surfaces 21a and 22a.

Next, the procedure for assembling bus bar plate 40 of the first embodiment will be described. First, bus bars 30 are supported by bus bar retainer 41 of bus bar plate 40. By engaging bus bars 30 in bus bar retainer 41, each bus bar 30 can be easily positioned so that it corresponds to electrically-connected output terminals 21 and 22. In this way, only by adjusting bus bars 30 to bus bar retainer 41 of bus bar plate 40, it is possible to determine the direction to which bus bars 30 are connected. Therefore, a short circuit caused by misconnection can be prevented.

Bus bar plate 40 is positioned in the side of output terminals 21 and 22 of battery module 20 (FIG. 3A).

Bus bar plate 40 is supported in the second position in which bus bars 30 are separated from terminals surfaces 21a and 22a by guiding means G, which has stud 50 and guide block 60 (FIG. 3B). That is, stud 50 passes through through-groove 31 of bus bars 30, entrance opening part 42 of bus bar plate 40, notch 63 of guide block 60 and notches 32 and 66. Third bar 54 of stud 50, which reaches space 62, contacts to guide surface 61. Therefore, bus bar plate 40 is supported in the second position.

Next, bus bar plate 40 moves to the first position wherein bus bars 30 are forcibly connected to terminal surfaces 21a and 22a by guiding means G (FIG. 3C). That is, by moving guide block 60 downward in the figure and guiding third bar 54 of stud 50 by guide surface 61, bus bar plate 40 located in the second position is moved toward terminal surfaces 21a and 22a. Guide block is moved further downward until second bar 52 of stud 50 is engaged in storage room 64 of guide block 60. Therefore, bus bar plate 40 is moved to the first position (see FIG. 3C). By engaging second bar 53 in storage room 64, bus bars 30 are pressingly contacted to terminal surfaces 21a and 22a.

Then, by locking means L, which has concave and convex engaging parts 70, bus bar plate 40 is supported in the first position, thereby maintaining the state wherein bus bars 30 are forcibly connected to terminals surfaces 21a and 22a (FIG. 3C). That is, while second bar 52 of stud 50 is engaged in storage room 64, convex engaging part 53 of stud 50 is engaged in concave engaging part 65 of guide block 60, and stud 50 is fixed. Therefore, bus bar plate 40 is supported in the first position and fixed corresponding to battery module 20. Furthermore, bus bars 30 are in contact with terminal surfaces 21a and 22a under a regulated surface pressure, and these electrical connections are maintained in a good condition for a long period of time.

As described above, according to the first embodiment, by guiding means G, bus bar 40 is moved to the first position in which bus bars 30 are forcibly connected to terminal surfaces 21a and 22a. By locking means L, bus bar plate 40 is supported in the first position, thereby maintaining the state in which bus bars 30 are forcibly connected to terminal surfaces 21a and 22a. Therefore, it is possible to electrically connect a plurality of bus bars 30 that are supported in bus bar plate 40 to output terminals 21 and 22 of battery module 20. According to guiding means G and locking means L of the first embodiment, by using an easy operation of sliding guide block 60 to stud 50, bus bars 30 can be collectively connected to output terminals 21 and 22. In this way, the bolting operation is not required. Therefore, the operation can be extremely simple, and the operation time may be significantly shortened compared to a method in which each bus bar 30 needs to be bolted. Furthermore, since the bolting operation is not required, it is possible to fundamentally prevent short circuit caused by falling bolts.

In conclusion, according to the first embodiment, it is possible to provide assembled battery 10 equipped with insulating bus bar plate 40 that supports bus bars 30, to omit the bolting operation, to simplify the operation for electrically connecting bus bars 30 to output terminals 21 and 22, and to facilitate the assembly.

Figure 6:
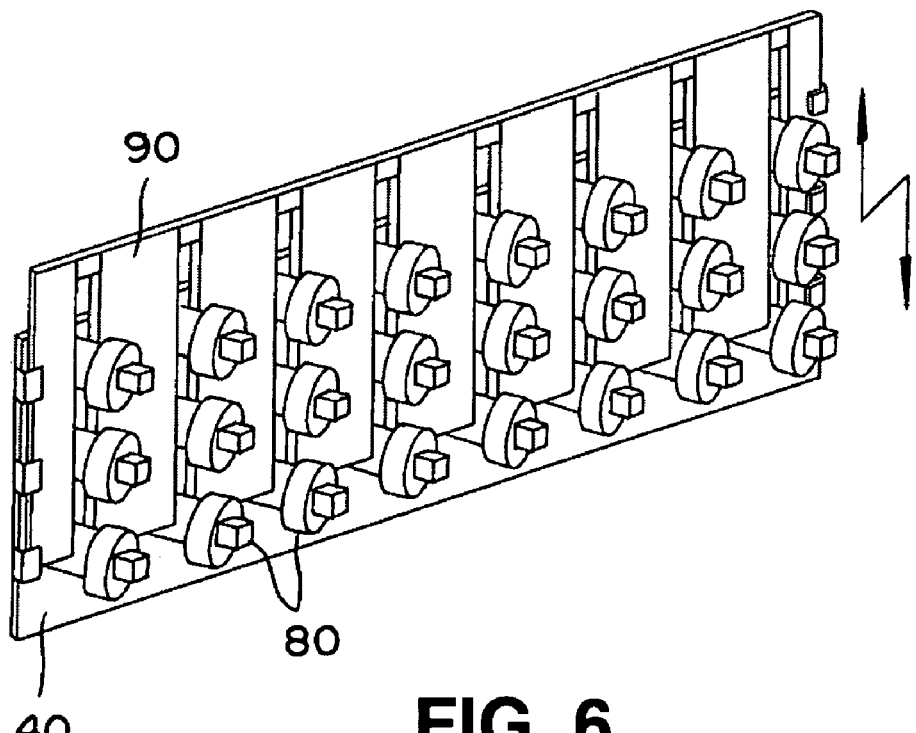
FIG. 6 is a perspective view illustrating the assembled battery of a second embodiment of the present invention.
Figure 9A:
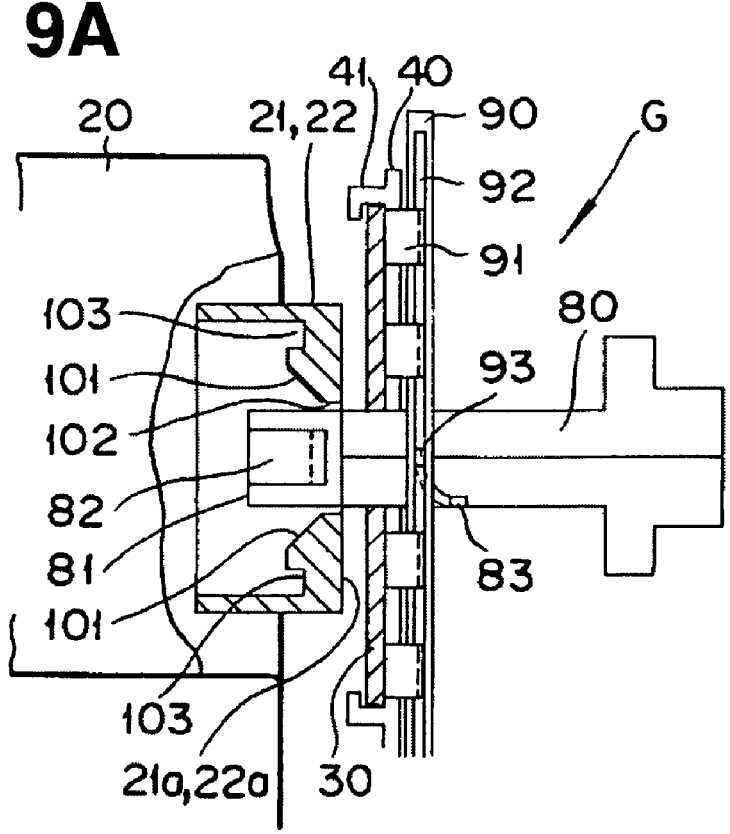
FIGS. 9A and 9B are explanatory diagrams of the operation of the second embodiment.
Figure 9B:
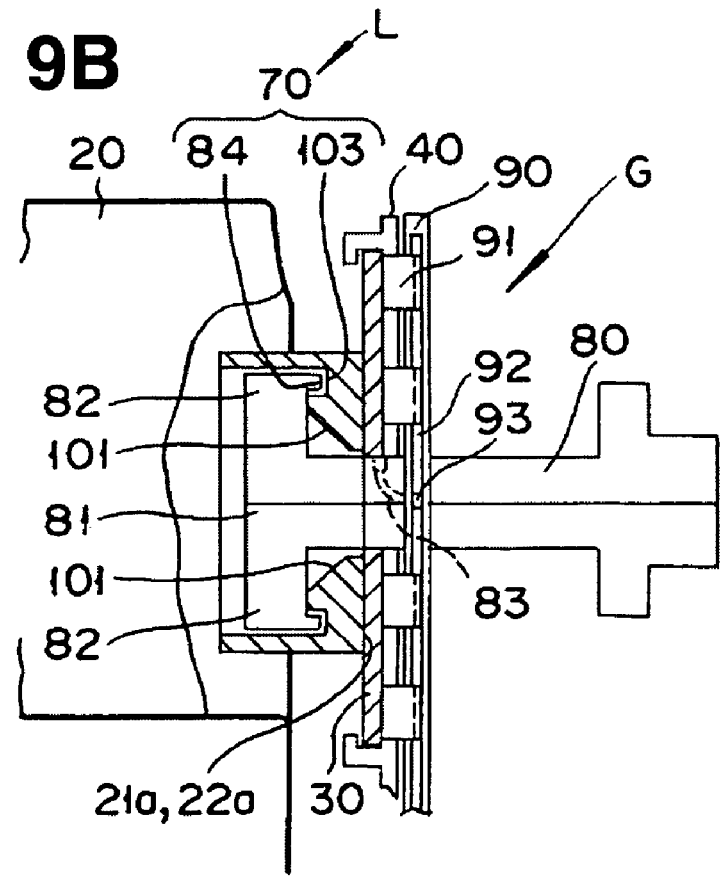

FIG. 6 is a perspective view illustrating assembled battery 10 of a second embodiment of the present invention. FIGS. 7A and 7B are a sectional side view and a front view illustrating a portion of output terminal 21 of cell module of the second embodiment. FIGS. 8A, 8B and 8C are a front view, a flat view and a side view illustrating a clip used in the second embodiment. FIGS. 9A and 9B are explanatory diagrams of the operation of the second embodiment. Here, the same reference numerals are assigned to the parts that are used in the first embodiment, and their operation is substantially similar. Only output terminal 21 is shown in FIGS. 7A and 7B, but output terminal 22 also has the same structure in this embodiment.

As in the case with assembled battery 10 of the first embodiment, assembled battery 10 of the second embodiment is comprised of a plurality of battery modules 20, which have negative and positive output terminals 21 and 22 having terminal surfaces 21a and 22a, and insulating bus bar plate 40 that supports conductive bus bars 30 that are electrically connected to terminals surfaces 21a and 22a. Furthermore, assembled battery 10 is comprised of guiding means G that movably guides bus bar plate 40 between the first position in which bus bars 30 are forcibly connected to terminal surfaces 21a and 22a and the second position in which bus bars 30 are separated from terminal surfaces 21a and 22a, and locking means L that supports bus bar plate 40 in the first position and maintains the state in which bus bars 30 are forcibly connected to terminal surfaces 21a and 22a. In general, the second embodiment differs from the first embodiment with respect to the structures of guiding means G and locking means L.

In the second embodiment, guiding means G is comprised of rotatable clip 80, guide piece 82 and guide plate 90. Rotatable clip 80 (corresponds to axial member) has edge 81 (corresponding to edge part) that is inserted from terminal surfaces 21a and 22a into electrode terminals 21 and 22. Guide piece 82 is placed at edge 81 of clip 80 and moves on sloped guide surface 101 that is placed inside output terminals 21 and 22 when clip 80 rotates. Guide plate 90 is connected to bus bar plate 40 so that guide plate 90 can slide in a direction parallel to terminal surfaces 21a and 22a, and guide plate 90 rotates clip 80 as it slides. By sliding guide plate 90 in a direction parallel to terminals surfaces 21a and 22a so as to rotate clip 80, guide piece 82 of clip 80 is guided by sloped guide surface 101 placed inside output terminals 21 and 22, and bus bar plate 40 moves between the first position and second position. Furthermore, locking means L is placed at edge 81 of clip 80 and inside output terminals 21 and 22 and has concave and convex engaging parts 70 that engage each other as clip 80 rotates.

As shown in FIGS. 6, 9A and 9B, clip 80 rotatably passes through bus bar plate 40. As shown in FIGS. 8A-8C, a pair of guide pieces 82, which are extended to edge 81 in a radial manner, are placed in clip 80. FIGS. 7A and 7B illustrate output terminals 21 and 22 of battery module 20 having a hollow center and through hole 102 created in terminal surfaces 21a and 22a wherein edge 81 of clip 80 is inserted. Hole 102 of terminal surfaces 21a and 22a is created long enough so that guide piece 82 of clip 80 can pass through. Sloped guide surface 101 on which guide piece 82 of clip 80 moves when clip 80 rotates is formed in the inner surface of output terminals 21 and 22. The height of sloped guide surface 101 increases gradually from the edge where guide piece 82 moves on to the end edge (length between terminal surfaces 21a and 22a and the left side of FIG. 9A). Therefore, when edge 81 of clip 80 is inserted into output terminals 21 and 22 to rotate clip 80, guide piece 82 comes in contact with sloped guide surface 101, and clip 80 moves toward output terminals 21 and 22. Spiral-shaped key groove 83 is created on the circumferential surface of the axis of clip 80.

Guide plate 90 is placed in the front side of bus bar plate 40 and clip 80 rotatably passes through guide plate 90. Also, guide plate 90 is connected to bus bar plate 40 so that it can slide in a direction parallel to terminal surfaces 21a and 22a. Guide plate 90 is supported by bus bar plate 40 by engaging nail member 91, which is placed in bus bar plate 40 in key groove 92 created in guide plate 90. Guide plate 90 is connected to clip 80 through pin components 93, which are engaged in key grooves 83 and 92. Therefore, if guide plate 90 is slid in a vertical direction in the figure to bus bar plate 40, this sliding movement makes clip 80 rotate.

Concave and convex engaging parts 70 are comprised of convex engaging part 84 (FIG. 8A), which is created at the edge of guide piece 82, and concave engaging part 103, which is created at the edge of sloped guide surface 101.

Guiding means G, which has clip 80, guide pieces 82 and guide plate 90, movably supports bus bar plate 40 between the first position in which bus bars 30 are forcibly connected to terminals surfaces 21a and 22a and the second position in which bus bars 30 are separated from terminal surfaces 21a and 22a. That is, edge 81 of clip 80 is inserted into output terminals 21 and 22 to slightly rotate clip 80. By doing so, bus bar plate 40 is supported in the second position in which bus bars 30 are separated from terminals surfaces 21a and 22a (see FIG. 9A). When guide plate 90 is slide downward in a direction parallel to terminals surfaces 21a and 22a (vertical direction in the figure), clip 80, which is connected to guide plate 90 through key grooves 83 and 92 and pin components 93, rotates. While guide pieces 82 of clip 80, which move on sloped guide surface 101 located inside output terminals 21 and 22, are guided by sloped guide surface 101, bus bar plate 40 moves toward terminal surfaces 21a and 22a. If guide plate 90 is slid further downward, convex engaging part 84 (FIGS. 8A and 8B) of clip 80 is engaged in concave engaging part 103 of output terminals 21 and 22. As a result, bus bar plate 40 moves to the first position wherein bus bars 30 are forcibly connected to terminals surfaces 21a and 22a (see FIG. 9B).

By locking means L, which has concave and convex engaging parts 70, bus bar plate 40 is supported in the first position. That is, by sliding guide plate 90 and rotating clip 80, convex engaging part 84 (FIGS. 8A and 8B) of clip 80 is engaged in concave engaging part 103 of output terminals 21 and 22, and the axial direction of clip 80 is fixed. As a result, bus bar plate 40 is supported in the first position and the state in which bus bars 30 are forcibly connected to terminals surfaces 21a and 22a is maintained.

Next, the procedure for assembling bus bar plate 40 of the second embodiment will be described.

Bus bar plate 40 supporting bus bars 30 is placed in the side of output terminals 21 and 22 of battery module 20.

By guiding means G, which has clip 80, guide pieces 82 and guide plate 90, bus bar plate 40 is supported in the second position wherein bus bars 30 are separated from terminals surfaces 21a and 22a (FIG. 9A). That is, edge 81 of clip 80 is inserted into output terminals 21 and 22 to slightly rotate clip 80. By doing so, bus bar plate 40 is supported in the second position.

Next, by guiding means G, bus bar plate 40 is moved to the first position in which bus bars 30 are forcibly connected to terminal surfaces 21a and 22a (FIG. 9B). That is, by sliding guide plate 90 downward in the figure, rotating clip 80 and guiding guide pieces 82 of clip 80 by sloped guide surface 101 located inside output terminals 21 and 22, bus bar plate 40 located in the second position is moved toward terminal surfaces 21a and 22a. Guide plate 90 is slid further downward until convex engaging part 84 (FIGS. 8A and 8B) of clip 80 is engaged in concave engaging part 103 of output terminals 21 and 22. As a result, bus bar plate 40 is moved to the first position (see FIG. 9B). By engaging convex engaging part 84 in concave engaging part 103, bus bars 30 are pressingly contacted to terminal surfaces 21a and 22a.

By locking means L, which has concave and convex engaging parts 70, bus bar plate 40 is supported in the first position and the state wherein bus bars 30 are forcibly connected to terminal surfaces 21a and 22a is maintained (FIG. 9B). That is, by sliding guide plate 90, rotating clip 80 and engaging convex engaging part 84 (FIGS. 8A and 8B) of clip 80 in concave engaging part 103 of output terminals 21 and 22, the axial direction of clip 80 is fixed. As a result, bus bar plate 40 is supported in the first position and fixed with respect to battery module 20. Also, bus bars 30 are in contact with terminal surfaces 21a and 22a under a regulated surface pressure, and their electrical connection is maintained in a good condition for a long period of time.

As described above, according to the second embodiment, as is in the case with the first embodiment, a plurality of bus bars 30 supported in bus bar plate 40 can be electrically connected to output terminals 21 and 22 of battery module 20. According to guiding means G and locking means L of the second embodiment, by using an easy operation of sliding guide plate 90 to rotate clip 80, it is possible to connect all bus bars 30 to output terminals 21 and 22. In this way, any bolting operation is not required. Therefore, the operation can be extremely simple and the operation time may be significantly shortened compared to a method in which each bus bar 30 needs to be bolted. Furthermore, since the bolting operation is not required, it is possible to fundamentally prevent a short circuit caused by falling bolts.

In conclusion, according to the second embodiment, it is also possible to provide assembled battery 10 equipped with insulating bus bar plate 40 that supports bus bars 30. Moreover, it is possible to avoid any bolting operation, to potentially simplify the operation for electrically connecting bus bars 30 to output terminals 21 and 22, and to facilitate the assembly of the battery.

Various embodiments of the invention have been described. These and other embodiments are within the scope of the following claims.

What is claimed is:

1. An assembled battery comprising:
a plurality of battery modules equipped with electrode terminals having a terminal surface;
an insulating support plate which supports a conductive bus bar electrically connected to the terminal surface;
a guide that movably guides the support plate between a first position where the bus bar is forcibly connected to the terminal surface and a second position where the bus bar is separated from the terminal surface; and
a lock that supports the support plate in the first position and maintains the state wherein the bus bar is forcibly connected to the terminal surface.

2. The assembled battery of claim 1, wherein the guide comprises a bar member that protrudes from the terminal surface and a guide block that is placed in the support plate and has a guide surface guiding the bar member.

3. The assembled battery of claim 2, wherein the guide surface is inclined toward the terminal surface and, by sliding the guide block in parallel to the terminal surface, the bar member is guided by the guide surface of the guide block so that the support plate moves between the first position and the second position.

4. The assembled battery of claim 3, wherein the lock has concave and convex engaging parts which are engaged as the guide block slides.

5. The assembled battery of claim 1, wherein the guide comprises a rotatable axial member having an edge being inserted from the terminal surface to the electrode terminals.

6. The assembled battery of claim 5, wherein the guide further comprises a guide piece located in the edge of the axial member and movable on a sloped guide surface placed inside the electrode terminals as the axial member rotatably moves.

7. The assembled battery of claim 6, wherein the guide further comprises a guide plate connected to the support plate in a way that the guide plate can slide in parallel to the terminal surface and rotate the axial member, and, by sliding the guide plate in parallel to the terminal surface and rotating the axial member, the guide piece of the axial member is guided by the sloped guide surface inside the electrode terminals and the support plate moves between the first position and the second position.

8. The assembled battery of claim 7, wherein the lock is placed in the edge of the axial member and inside the electrode terminals and has concave and convex engaging parts which are engaged as the axial member rotates.

9. The assembled battery of claim 1, wherein the assembled battery comprises an in-vehicle battery.

10. An assembled battery comprising:
a plurality of battery modules equipped with electrode terminals having a terminal surface;
an insulating support plate which supports a conductive bus bar electrically connected to the terminal surface;
means for movably guiding the support plate between a first position where the bus bar is forcibly connected to the terminal surface and a second position where the bus bar is separated from the terminal surface; and
means for locking the support plate in the first position and for maintaining the state wherein the bus bar is forcibly connected to the terminal surface.

11. The assembled battery of claim 10, wherein the guide means comprises a bar member and means for guiding the bar member between a first vertical position and a second vertical position.

12. The assembled battery of claim 10, wherein the locking means has concave and convex engaging parts.

13. The assembled battery of claim 10, wherein the guide means comprises a rotatable axial member having an edge being inserted from the terminal surface to the electrode terminals.

14. The assembled battery of claim 10, wherein the assembled battery comprises an in-vehicle battery.

15. A method for assembling a battery comprising:
moving an insulative support plate along a guide to a position where a conductive bus bar of the support plate is forcibly connected to a plurality of battery modules equipped with electrode terminals having a terminal surface; and
locking the support plate in the position to maintain the bus bar forcibly connected to the terminal surface.

16. The method of claim 15, wherein the guide comprises a bar member that protrudes from the terminal surface and a guide block that is placed in the support plate and has a guide surface that is inclined toward the terminal surface, and wherein moving an insulative support plate comprises sliding the guide block parallel to the terminal surface along the guide surface toward the terminal surface to guide the bar member so that the support plate moves to the position.

17. The method of claim 15, wherein locking the support plate comprises engaging concave and convex of a lock member.

18. The method of claim 15, wherein moving an insulative support plate comprises rotating an axial member having an edge being inserted from the terminal surface to the electrode terminals.

19. The method claim 15, further comprising placing the assembled battery in a vehicle.

* * * * *